(12) United States Patent
Sakurai et al.

(10) Patent No.: US 7,703,340 B2
(45) Date of Patent: Apr. 27, 2010

(54) CHIP FOR FORCE SENSOR AND FORCE SENSOR

(75) Inventors: Nobuhiro Sakurai, Saitama (JP); Takeshi Ohsato, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 11/896,093

(22) Filed: Aug. 29, 2007

(65) Prior Publication Data

US 2008/0066562 A1    Mar. 20, 2008

(30) Foreign Application Priority Data

Aug. 30, 2006 (JP) .............................. 2006-234585

(51) Int. Cl.
  G01L 1/22    (2006.01)
  G01L 1/00    (2006.01)
  G01D 7/00    (2006.01)
  H01L 41/00   (2006.01)

(52) U.S. Cl. ............................ 73/862.044; 73/862.041; 73/764; 310/311; 310/357

(58) Field of Classification Search ................................ 73/862.041–862.045, 764; 310/311, 346, 310/357
See application file for complete search history.

(56) References Cited

U.S. PATENT DOCUMENTS

| | | | | |
|---|---|---|---|---|
| 3,985,025 A | * | 10/1976 | Ormond | ...................... 177/255 |
| 4,448,083 A | * | 5/1984 | Hayashi | .................. 73/862.042 |
| 4,454,771 A | * | 6/1984 | Shimazoe et al. | ......... 73/862.68 |
| 4,905,523 A | * | 3/1990 | Okada | .................... 73/862.044 |
| 5,095,762 A | * | 3/1992 | Holm-Kennedy et al. | ...................... 73/862.041 |
| 6,742,390 B2 | * | 6/2004 | Mochida et al. | ........... 73/504.14 |
| 2003/0140713 A1 | * | 7/2003 | Ohsato et al. | ........... 73/862.041 |
| 2004/0055390 A1 | * | 3/2004 | Hashimoto et al. | ............ 73/777 |
| 2004/0164753 A1 | * | 8/2004 | Hettori et al. | ................ 324/725 |
| 2005/0081645 A1 | * | 4/2005 | Ohsato et al. | ........... 73/862.041 |
| 2006/0086190 A1 | * | 4/2006 | Ohsato et al. | .................. 73/764 |
| 2006/0130596 A1 | * | 6/2006 | Wilner | ................... 73/862.627 |
| 2006/0174718 A1 | * | 8/2006 | Morimoto | .............. 73/862.044 |
| 2007/0000335 A1 | * | 1/2007 | Morimoto | .............. 73/862.045 |

FOREIGN PATENT DOCUMENTS

JP    2003-207405    7/2003
JP    2003-254843    9/2003

* cited by examiner

*Primary Examiner*—Lisa M Caputo
*Assistant Examiner*—Jonathan Dunlap
(74) *Attorney, Agent, or Firm*—Squire, Sanders & Dempsey L.L.P.

(57) ABSTRACT

A force sensor chip which comprises: a base member, which includes an action portion to which an external force is applied through an attenuator, a support portion supporting the action portion, and a connection portion which connects the action portion and the support portion and deflects according to the applied external force; and a plurality of strain resistance elements which are arranged in the connection portion and detect the applied external force based on a deflection of the connection portion, wherein longitudinal directions of the plurality of the strain resistance elements are oriented in an identical direction.

16 Claims, 11 Drawing Sheets

FIG.1A
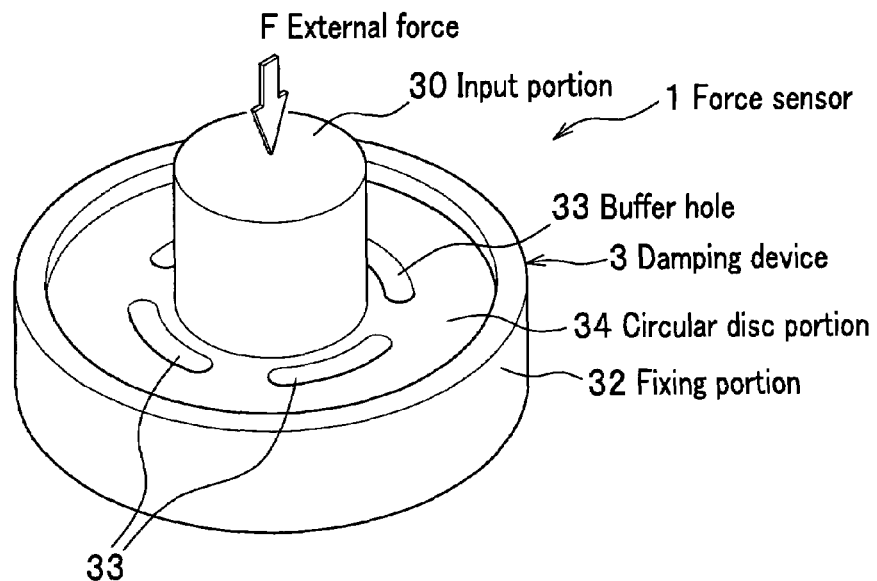
FIG.1B
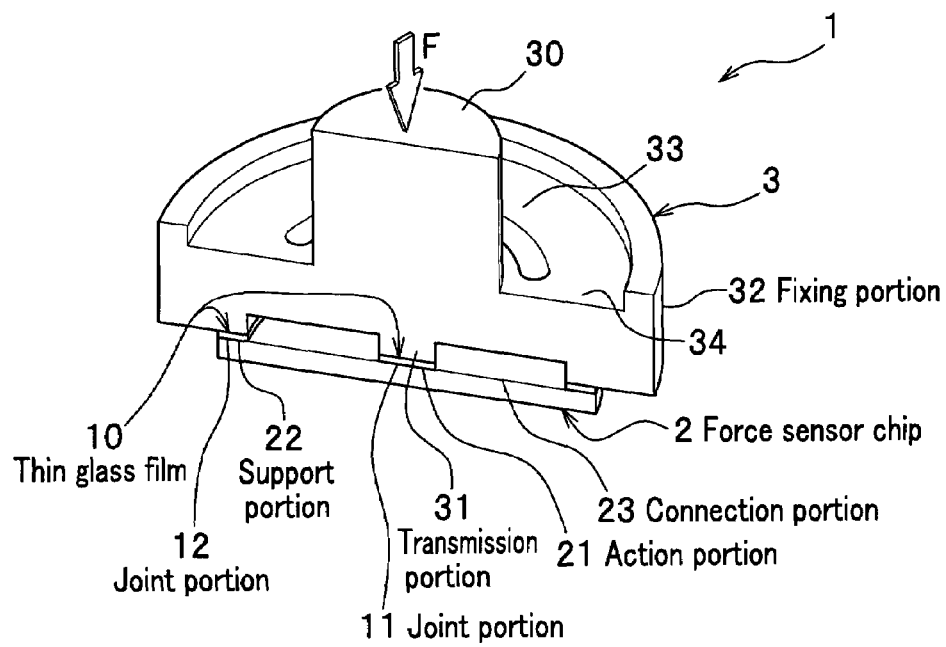
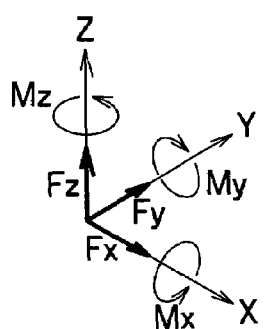

FIG.2
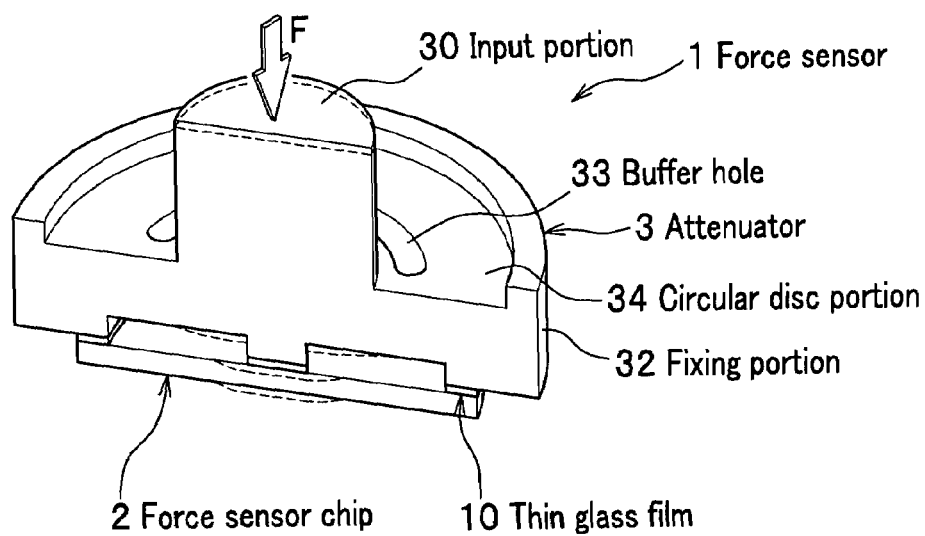
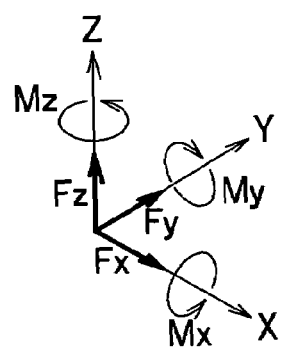

- 31
- 30
- 3 Attenuator
- 32 Fixing portion
- 10 Thin glass film
- T Heater
- G Glass

- 30
- 3
- 32
- 10
- 12
- 11
- Anodic-bonding
- 2 Force sensor chip

FIG.7A Fx applied
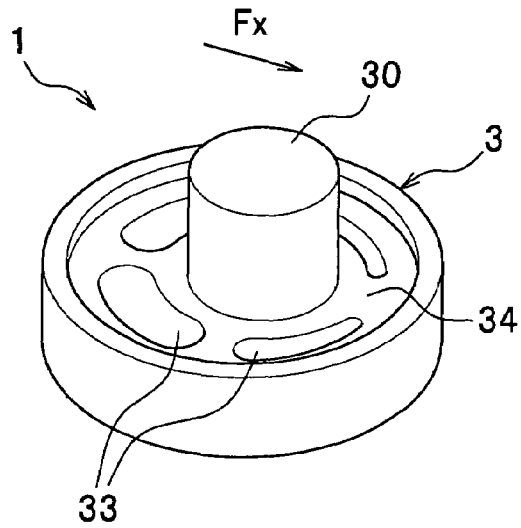
FIG.7B Fz applied
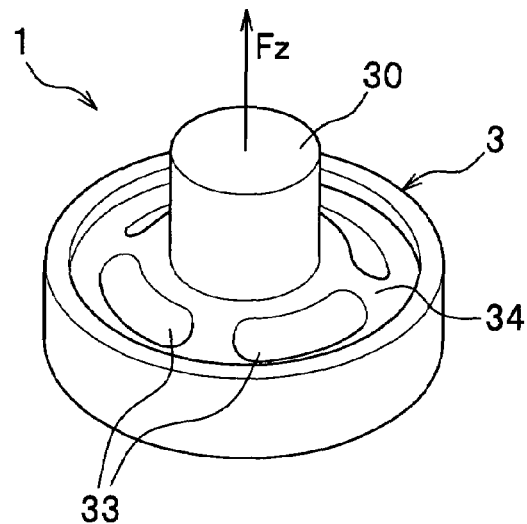
FIG.7C My applied
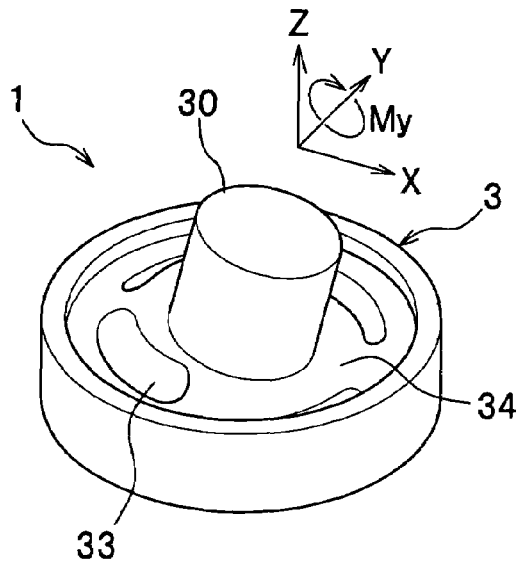
FIG.7D Mz applied
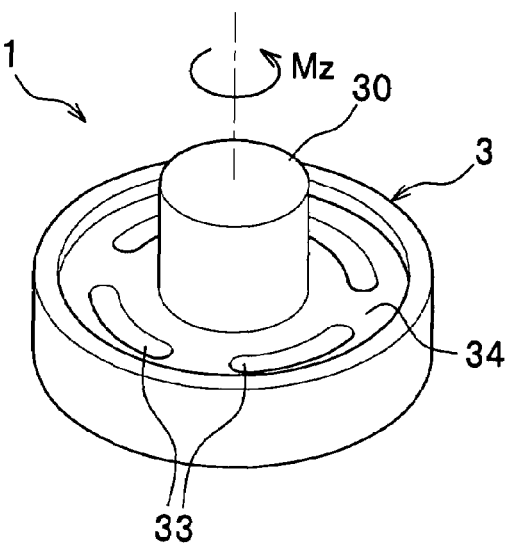
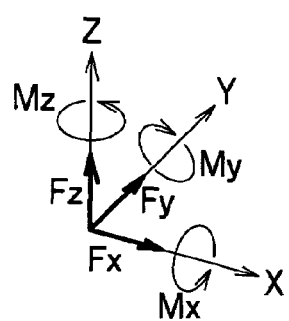

CHIP FOR FORCE SENSOR AND FORCE SENSOR

CROSS REFERENCE TO RELATED APPLICATIONS

This application claims the foreign priority benefit under Title 35, United States Code, §119(a)-(d) of Japanese Patent Application No. 2006-234585, filed on Aug. 30, 2006, the contents of which are hereby incorporated by reference.

BACKGROUND OF THE INVENTION

1. Field of the Invention

The present invention relates to a force sensor chip and a force sensor, and particularly relates to the force sensor chip and the force sensor which detect an applied external force using a plurality of strain resistance elements.

2. Description of Related Art

Conventionally, a multiaxial force sensor which precisely detects a strength and direction of an applied external force is used, for example, for industrial robots for correctly and flexibly controlling the external force applied during operations.

For example, a multiaxial force sensor which utilizes a property of a strain resistance element (piezoresistive element) is known, in which the resistance changes by a microstrain (compressive, tensile) due to an applied external force. The sensor is disclosed, for example, in Japanese Laid-open Patent Publication Numbers 2003-207405 and 2003-254843.

The multiaxial force sensor includes a force sensor chip fabricated on a semiconductor substrate through a semiconductor fabrication process and an attenuator formed by a metal member for fixing and housing the force sensor chip.

Practically, the force sensor detects a strength and direction of an external force by appropriately arranging a plurality of strain resistance elements around an action portion to which the applied external force is transmitted and by detecting changes of resistances of the strain resistance elements as electric signals. Meanwhile, if the applied external force is directly transmitted to the strain resistance elements, the force sensor chip may be damaged when the force is too large. Therefore, an attenuator is disposed for suitably responding to various kinds of external forces and transmitting the external forces to the force sensor chip by appropriately attenuating the external forces.

In a conventional force sensor chip, a plurality of strain resistance elements are often arranged on a semiconductor substrate in two directions orthogonally crossing each other. On the other hand, the semiconductor substrate is manufactured to have a surface with some crystal orientation. However, a small difference in crystal orientation is produced between the surface and the crystal orientation by a semiconductor substrate manufacturing process. If a plurality of the strain resistance elements are arranged orthogonally on the semiconductor substrate described above, a physical constant such as a piezoresistive coefficient becomes different among the elements, thereby resulting in non-uniform characteristics among the strain resistance elements. If the force sensor chips described above are applied to the multiaxial force sensor, a correction of non-uniformity is required among detected values because of the non-uniform characteristics among the strain resistance elements, thereby resulting in complexity of signal processing.

It is, therefore, desirable to provide a force sensor chip and a force sensor which can improve uniformity of characteristics among a plurality of strain resistance elements.

SUMMARY OF THE INVENTION

According to a first aspect of the present invention, there is provided a force sensor chip which comprises: a base member, which includes an action portion to which an external force is applied through an attenuator, a support portion supporting the action portion, and a connection portion which connects the action portion and the support portion and deflects according to the applied external force; and a plurality of strain resistance elements which are arranged in the connection portion and detect the applied external force based on a deflection of the connection portion, wherein longitudinal directions of the plurality of strain resistance elements are oriented in a same direction.

In the arrangement of the strain resistance elements described above, since the plurality of strain resistance elements are oriented in a same direction, a physical property of each of the strain resistance elements such as a piezoresistive coefficient can be made equal, even if there is a difference in orientation between a surface of the base member and the crystal orientation. As a result, uniformity of the physical property of the strain resistance elements can be improved.

According to a second aspect of the present invention, there is provided a force sensor chip described in the first aspect, wherein the force sensor chip is made of a silicon substrate whose surface has a crystal orientation of (100).

According to a third aspect of the present invention, there is provided a force sensor chip described in the second aspect, wherein the plurality of strain resistance elements are made of n-type semiconductor and the longitudinal directions of the plurality of strain resistance elements are oriented in <100> direction.

In the arrangement described above, outputs of the plurality of strain resistance elements can be enhanced.

According to a fourth aspect of the present invention, there is provided a force sensor chip described in the second aspect, wherein the plurality of strain resistance elements are made of p-type semiconductor and the longitudinal directions of the plurality of strain resistance elements are oriented in <110> direction.

In the arrangement described above, outputs of the plurality of strain resistance elements can be increased.

According to a fifth aspect of the present invention, there is provided a force sensor chip described in the first aspect, wherein the base member is made of a silicon substrate whose surface has a crystal orientation of (110).

According to a sixth aspect of the present invention, there is provided a force sensor chip described in the fifth aspect, wherein the plurality of strain resistance elements are made of n-type semiconductor and the longitudinal directions of the plurality of strain resistance elements are oriented in <100> direction.

In the arrangement described above, outputs of the plurality of strain resistance elements can be enhanced.

According to a seventh aspect of the present invention, there is provided a force sensor chip described in the fifth aspect, wherein the plurality of strain resistance elements are made of p-type semiconductor and the longitudinal directions of the plurality of strain resistance elements are oriented in <110> direction.

In the arrangement described above, outputs of the plurality of strain resistance elements can be enhanced.

According to a eighth aspect of the present invention, there is provided a force sensor chip described in the fifth aspect, wherein the plurality of strain resistance elements are made of p-type semiconductor and the longitudinal directions of the plurality of strain resistance elements are oriented in <111> direction.

In the arrangement described above, outputs of the plurality of strain resistance elements can be enhanced.

According to a ninth aspect of the present invention, there is provided a force sensor chip described in the first aspect, wherein the base member is made of a silicon substrate whose surface has a crystal orientation of (111).

According to a tenth aspect of the present invention, there is provided a force sensor chip described in the ninth aspect, wherein the plurality of strain resistance elements are made of p-type semiconductor and the longitudinal directions of the plurality of strain resistance elements are oriented in <110> direction.

In the arrangement described above, outputs of the plurality of strain resistance elements can be enhanced.

According to a eleventh aspect of the present invention, there is provided a force sensor chip described in the first to tenth aspects, wherein the plurality of strain resistance elements are composed of eight strain resistance elements.

In the arrangement described above, outputs of the plurality of strain resistance elements can be enhanced and a calculation volume for signal processing can be reduced.

According to a twelfth aspect of the present invention, there is provided a force sensor chip described in the first to eleventh aspects, which further comprises a temperature compensation resistance element for canceling a resistance change, which is caused by a temperature, of each of the plurality of strain resistance elements.

In the arrangement described above, a correction of each of the plurality of strain resistance elements can be achieved perfectly for the resistance change by the temperature.

According to a thirteenth aspect of the present invention, there is provided a force sensor, which comprises: a force sensor chip according to any one of the aspects 1 to 12; and an attenuator which is connected to the support portion and the action portion, and applies an input external force to the action portion by attenuating the input external force.

In the arrangement described above, since a force to be applied to the force sensor is attenuated, the force sensor chip can be prevented from damaging.

According to the present invention, uniformity of characteristics of a plurality of strain resistance elements can be improved.

BRIEF DESCRIPTION OF THE DRAWINGS

FIG. 1A is a perspective view for explaining a brief constitution of a force sensor according to an embodiment of the present invention and showing an outer shape of the force sensor;

FIG. 1B is a perspective view for explaining a brief constitution of the force sensor according to the embodiment and showing a cross section of an internal structure of the force sensor;

FIG. 2 is a cross sectional perspective view schematically showing an external force which is attenuated and transmitted to a force sensor chip;

FIG. 7A is a perspective view showing a behavior of an attenuator when an external force Fx is applied to the attenuator;

FIG. 7B is a perspective view showing a behavior of the attenuator when an external force Fz is applied to the attenuator;

FIG. 7C is a perspective view showing a behavior of the attenuator when a moment My is applied to the attenuator;

FIG. 7D is a perspective view showing a behavior of the attenuator when a moment Mz is applied to the attenuator;

DETAILED DESCRIPTION OF THE PREFERRED EMBODIMENT

Figure 3:
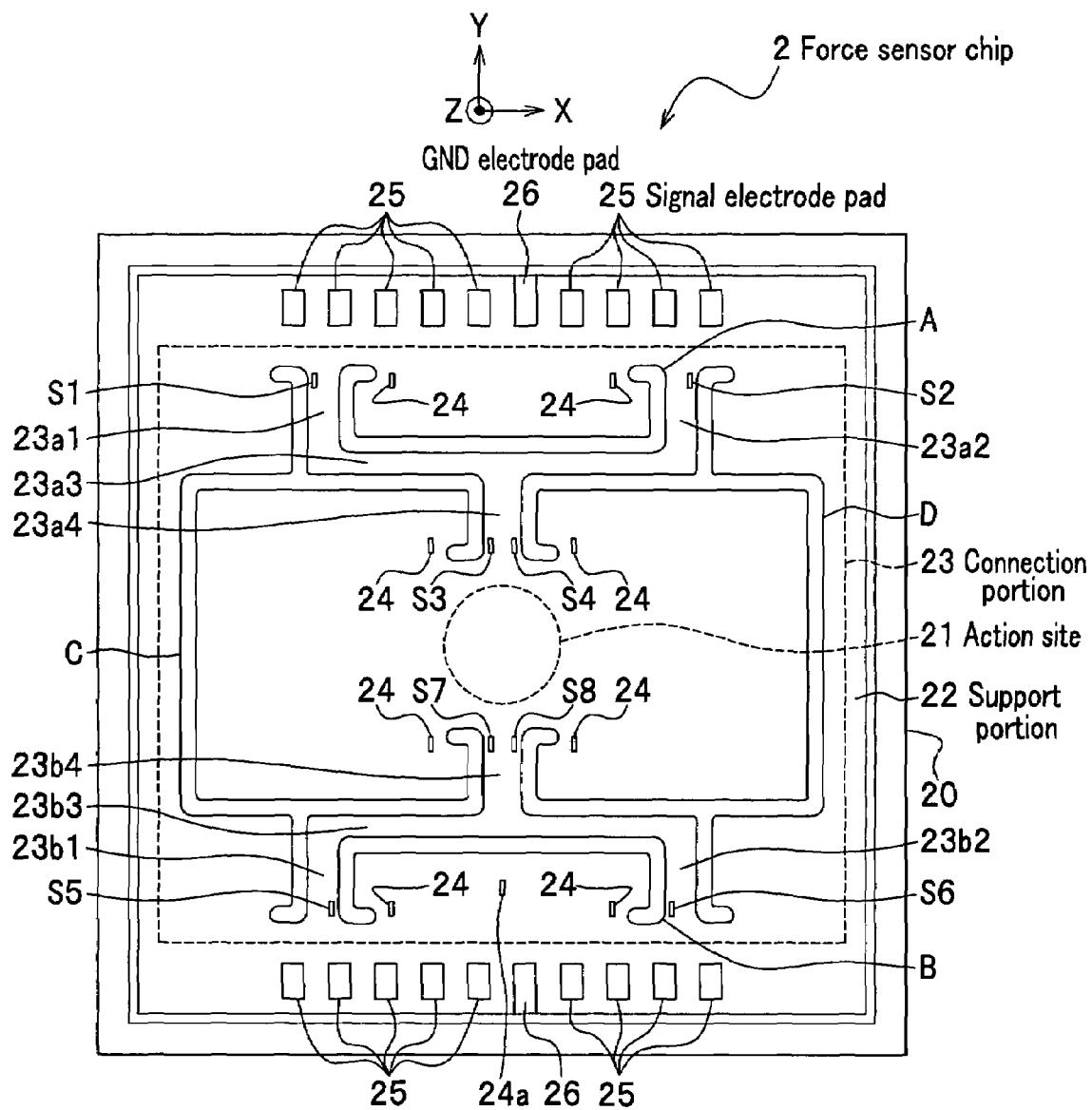
FIG. 3 is a plane view showing a main part of a force sensor chip for explaining the force sensor chip according to the embodiment in detail.

First, a whole composition of a force sensor according to an embodiment of the present invention will be explained by referring to FIG. 1A to FIG. 3. FIG. 1A is a perspective view for explaining a brief constitution of a force sensor according to an embodiment of the present invention and showing an outer shape of the force sensor. FIG. 1B is a perspective view for explaining a brief constitution of the force sensor according to the embodiment and showing a cross section of an internal structure of the force sensor. FIG. 2 is a cross sectional perspective view schematically showing an external force which is attenuated and transmitted to a force sensor chip. FIG. 3 is a plane view showing a main part of a force sensor chip for explaining the force sensor chip according to the embodiment in detail.

It is noted that for convenience, for example, a degree of strain and an appearance at a joint portion may be emphasized in the views in some cases.

As shown in FIG. 1A and FIG. 2A, a force sensor 1 according to the present invention is formed in a disc shape (see FIG. 1A) whose input portion 30 is protruded when it is seen from outside. The force sensor 1 includes a force sensor chip 2 (see FIG. 1B) for detecting six axis components of a transmitted external force F and an attenuator 3 for transmitting the external force F to the force sensor chip 2 by attenuating the force F as well as fixing the force sensor chip 2.

Here, the force sensor 1 according to the present invention will be explained using a six-axis force sensor 1, which can detect a force and moment of the external force F by separating the force F into six axis components. Practically, force components of the external force F for X-axis, Y-axis, and Z-axis, which are perpendicular to each other, are described as Fx, Fy, and Fz, respectively. Moment components around the X-axis, Y-axis, and Z-axis are described as Mx, My, and Mz, respectively.

It is noted that an explanation will be made by using the six-axis force sensor 1 as an example in the embodiment. However, in the present invention, for example, a shape, a detection axis number, and strength of an external force are not limited, and the present invention is applicable to, for example, a three-axis force sensor for detecting the Fx, Fy, and Fz.

The force sensor chip 2 is formed in approximately a square shape in plane view (see FIG. 3), and includes the action portion 21 to which the external force F (attenuated external force F1 is not shown) is transmitted through an attenuator, a support portion 22 supporting the action portion 21, and a connection portion 23 which connects the action portion 21 and the support portion 22 and deflects according to the applied external force F1.

The attenuator 3 is formed in a disc shape, and includes an input portion 30 to which the external force F is input, a transmission portion 31 for transmitting the external force F which is applied to the input portion 30 to the action portion 21 of the force sensor chip 2 by attenuating the external force F, a fixing portion 32 for fixing the force sensor chip 2, and a circular disc portion 34 for connecting the fixing portion 32 and the input portion 30. A buffer hole 33 which is formed in a long circular arc in plane view is disposed in the circular disc portion 32.

As described above, in the embodiment, the fixing portion 32 of the force sensor chip 2 and the transmission portion 31 for transmitting the external force F are connected on a same side with respect to the force sensor chip 2 (upper side in FIG. 1B) in the attenuator 3. Because of the arrangement described above, a whole thickness of the force sensor can be thinned.

In addition, since the circular disc portion 34 which connects the fixing portion 32 and the input portion 30 is disposed, as shown in FIG. 2, the external force F applied to the input portion 30 is mainly received by the fixing portion 32 and transmitted to an outside member. On the other hand, since the buffer hole 33 is disposed on the circular disc portion 34, the input portion 30 is strained in a direction to which the external force F is applied. As a result, a part of the external force F is transmitted to the transmission portion 31 from the input portion 30 after the external force F is attenuated. As described above, since the force F1 to be transmitted to the action portion 21 is suitably adjusted in response to strength of the external force F, the force sensor can respond appropriately to various kinds of external force F. For example, if the attenuator 3 is designed so that the force F1 to be applied to the action portion 21 of the force sensor chip 2 is reduced to one-tenth the external force F, the force sensor chip 2 is capable of detecting ten times as strong a force as the endurance strength of the force sensor chip 2.

Here, the force sensor chip 2 and the attenuator 3 are bonded by anodic-bonding through a thin glass film 10.

A joint portion 11 is a joint portion between the action portion 21 of the force sensor chip 2 and the transmission portion 31 of the attenuator 3, and a joint portion 12 is a joint portion between the support portion 22 of the force sensor chip 2 and the fixing portion 32 of the attenuator 3.

It is noted that in the embodiment, the thin glass film 10 on a side of the attenuator 3 is formed on an entire bottom surface of a mounting portion 32b. However, a formation of the thin glass film 10 is not limited to this. The formation of the glass film 10 is sufficient if the glass film 10 is formed at least on the joint portions 11, 12 on which the force sensor chip 2 is bonded. In addition, a bonding method of the joint portions 11, 12 is not limited to the anodic-bonding. Other bonding methods using, for example, a widely-known epoxy resin adhesive agent may be used for bonding the joint portions 11, 12.

As shown in FIG. 3, the strain resistance elements S1 to S8 are arranged on predetermined positions on the connection portion 23. Eight temperature compensation resistance elements 24 are arranged in the vicinity of corresponding strain resistance elements S1 to S8, respectively on the support 22 or the connection portion 23. The strain resistance elements S1 to S8 and the temperature compensation resistance elements 24 are connected to signal electrode pads 25 and GND electrode pads 26 with wirings described later.

Eighteen signal electrode pads 25 are disposed on the force sensor chip 2. Sixteen signal pads 25 out of the eighteen pads 25 correspond to eight strain resistance elements and eight temperature compensation resistance elements. One signal electrode pad 25 corresponds to a monitoring resistance element 24a, and the last one is a spare pad.

Through holes A to D are formed on the semiconductor substrate 20 (the semiconductor substrate 20 is one example of a base member). Functions of the action portion 21, the support portion 22, and the connection portion 23 in the semiconductor substrate 20 can be achieved by the through holes A to D. That is, the applied force F1 acts so as to displace the action portion 21 against the support portion 22. Therefore, compressive forces and tensile forces are generated in portions between the through holes A to D, especially in bridging portions 23a1, 23a2, 23a4, 23b1, 23b2, ands 23b4. The strain resistance elements S1 to S8 are arranged at positions on the connection portion 23, where strains caused by the applied force F1 are sufficiently large, and detect strains (compressive force and tensile force) at each of the positions. In addition, the eight temperature compensation resistance elements 24 are arranged in the vicinity, but in which the eight temperature compensation resistance elements 24 are not affected by the strains caused by the applied force F1, of the corresponding strain resistance elements S1 to S8, respectively. The through holes A to D, the strain resistance elements S1 to S8, and the temperature compensation resistance elements 24 will be described later in detail.

Figure 4A:
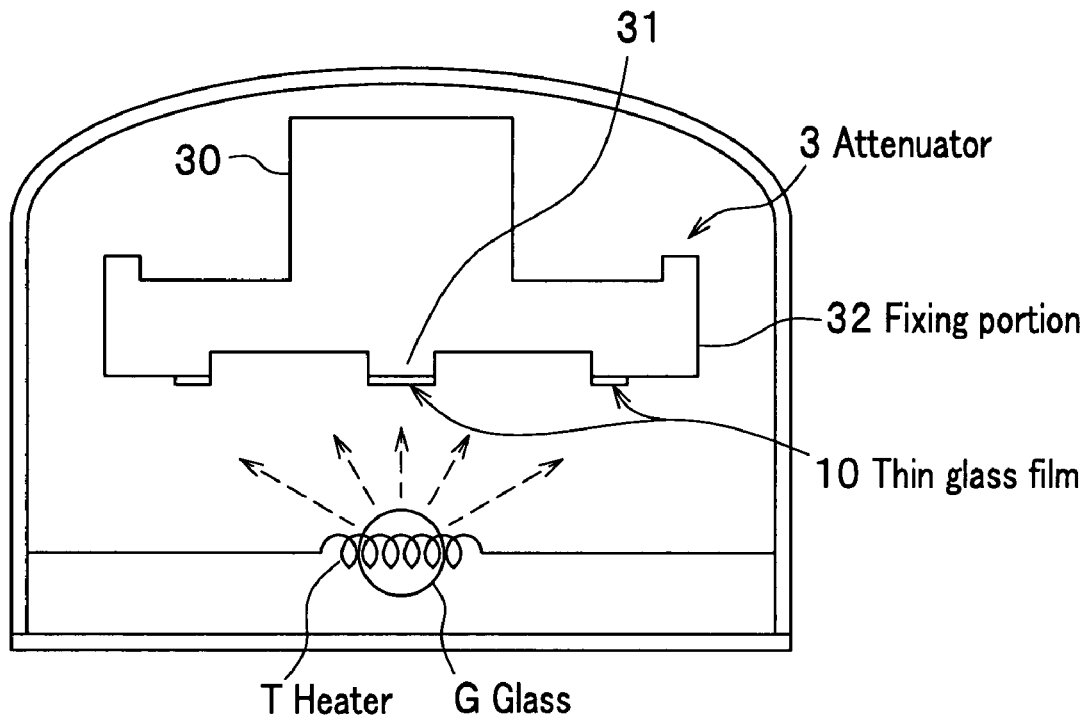
FIG. 4A is a schematic diagram for explaining a fabrication method of a force sensor according to the embodiment and showing an arrangement for forming a thin glass film of the force sensor.
Figure 4B:
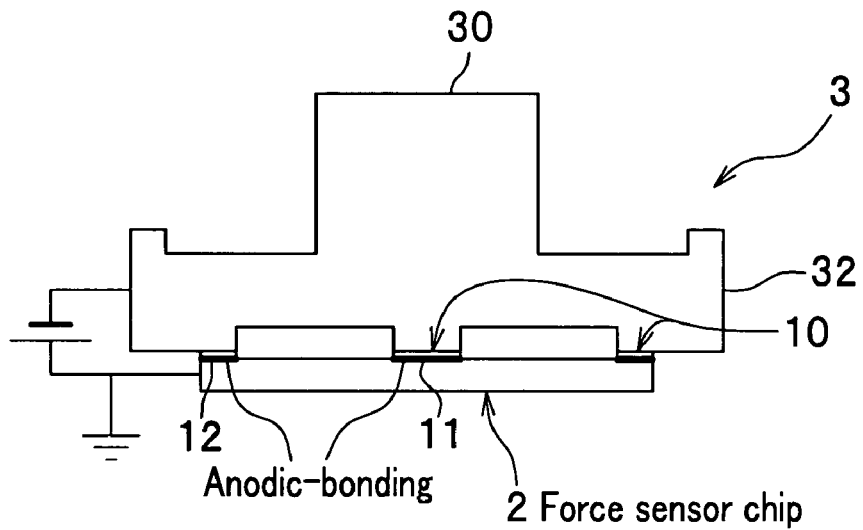
FIG. 4B is a cross sectional view for explaining the fabrication method of the force sensor according to the embodiment and showing an anodic-bonding of the force sensor.

Next, a fabrication method of the force sensor 1 according to the embodiment of the present invention, which is composed as described above, will be explained by referring to FIG. 4A and FIG. 4B. FIG. 4A is a schematic diagram for explaining a fabrication method of a force sensor according to the embodiment of the present invention, in which a formation of a thin glass film is shown. FIG. 4B is a cross sectional view for explaining a fabrication method of a force sensor according to the embodiment of the present invention, in which an anodic-bonding is shown.

A fabrication process of the force sensor 1 includes a fabrication process of the force sensor chip 2, a fabrication process of the attenuator 3, and an anodic-bonding process of the force sensor chip 2 and the attenuator 3.

The fabrication process of the force sensor chip 2 includes a process (see FIG. 3) for disposing each resistance element (for example, strain resistance element S, temperature compensation resistance element 24) by forming an active layer on a semiconductor substrate (wafer), a process for forming contact holes (not shown), a process for forming wirings, pad areas 25, 26 (see FIG. 3), and through holes A to D (see FIG. 3), and a process for cutting out semiconductor chips from the wafer.

In the process of disposing the each resistance element, the strain resistance element S, the temperature compensation resistance element 24, and the monitoring resistance element 24a (see FIG. 3) are formed at predetermined positions on the semiconductor substrate (wafer). For example, boron atoms, which are p-type impurities, are ion-implanted in the semiconductor substrate of n-type (100) silicon using a resist pattern, which is formed by photolithography, as a mask for forming the resistance elements.

In the fabrication process of the attenuator 3, for example, the attenuator 3 is fabricated by a machining process or electric discharge machining. A process of forming the thin glass film 10 on the fixing portion 32 and on the bottom surface of the transmission portion 31 is performed by, for example, evaporation.

In a bonding process of the attenuator 3 and the force sensor chip 2, the thin glass film 10 formed on the attenuator 3 by, for example, a well-known evaporation method is bonded to the force sensor chip 2 by anodic-bonding.

Thermal expansion coefficients of the semiconductor substrate 20 and metal (for example, stainless steel) are largely different. Therefore, if the force sensor chip 2 which is made of the semiconductor substrate 20 and the attenuator made of metal are directly bonded, damage such as a peeling off at the joint portion may be caused by the difference in the thermal expansion coefficients. Then, in the embodiment, the bonding is made through the thin glass film 10 having a thermal expansion coefficient between the thermal expansion coefficient of the semiconductor substrate 20 and that of the metal. As a result, the bonding strength at the joint portions 11, 12 is reinforced, and the insulation between the force sensor chip 2 and the attenuator 3 is ensured. By ensuring the insulation, a leakage current from the force sensor chip 2 to the attenuator 3 can be prevented.

In the embodiment, the thin glass film 10 (for example, 0.05 μm to 20 μm in thickness) instead of a glass plate is formed on the attenuator 3 by evaporation or sputtering. The force sensor chip 2 is anodic-bonded using the thin glass film 10. Therefore, breakdown and degradation of bonding strength of an interface between the attenuator 3 and the thin glass film 10 can be prevented even if a reverse voltage is generated between the attenuator 3 and the thin glass film 10 by the anodic-bonding, thereby resulting in keeping the bonding strength.

In addition, since the thin glass film 10 is formed (for example, 0.05 μm to 20 μm in thickness) by evaporation or sputtering, a glass layer which is far thinner than a glass plate can be formed. Therefore, an effect of deflection of the glass layer by an external force can be reduced to the minimum, thereby resulting in possibility of neglect of the glass layer deflection. As a result, a complex correction of an output of the force sensor chip by considering the glass layer deflection becomes unnecessary, thereby resulting in an accurate detection of the output by a simple data processing.

Meanwhile, it is preferable to form the thin glass film 10 thicker considering insulating function and bonding function of the thin glass film 10. On the other hand, it is preferable to form the thin glass film 10 thinner considering force sensor function and buffering function for a difference in thermal expansion coefficients between the force sensor chip 2 and the attenuator 3. Therefore, the thickness of 0.05 μm to 20 μm was determined as an appropriate value of the thin glass film 10 so that the insulating function, ensured bonding function, force sensor function, and buffering function for the difference in the thermal expansion coefficients can be achieved simultaneously, by considering various kinds of measured date.

In addition, since a preparation of a glass plate and a machining process such as a cutting work are unnecessary, a load bearing, durability, and reliability can be improved by preventing the force sensor from generating micro-cracks, while cutting the cost by reducing a number of components.

Next, a composition of the force sensor chip 2 will be explained in detail by referring to FIG. 3.

The action portion 21 is disposed at a center of the force sensor chip 2, and bonded to the transmission portion 31 of the attenuator 3 through the thin glass film 10 (see FIG. 1B).

The connection portion 23 is, as shown in FIG. 3, a portion connecting the action portion 21 and the support portion 22. In addition, long slit-like through holes A to D are disposed at predetermined positions. In the connection portion 23, bridging portions 23a1, 23a2 whose each one end is connected to the support portion 22 and extending in Y-axis direction, a beam-like elastic portion 23a3 whose both ends are connected to the each other end of the bridging portions 23a1, 23a2 and extending in X-axis direction, and a bridging portion 23a4 whose one end is connected to around a center of the elastic portion 23a3 with a T-shape and extending in Y-axis direction are disposed. In addition, in the connection portion 23, bridging portions 23b1, 23b2 whose each one end is connected to the support portion 22 and extending in Y-axis direction, a beam-like elastic portion 23b3 whose both ends are connected to the each other end of the bridging portions 23b1, 23b2 and extending in X-axis direction, and a bridging portion 23b4 whose one end is connected to around a center of the elastic portion 23b3 with a T-shape and extending in Y-axis direction are disposed facing the bridging portions 23a1, 23a2, the elastic portion 23a3, and the bridging portion 23a4. Strain resistance elements S1, S2 are disposed in the bridging portions 23a1, 23a2, respectively. Strain resistance elements S3, S4 are disposed side-by-side in the width direction of the bridging portion 23a4. In addition, strain resistance elements S5, S6 are disposed in the bridging portions 23b1, 23b2, respectively. Strain resistance elements S7, S8 are disposed side-by-side in the width direction of the bridging portion 23b4. The bridging portions 23a4, 23b4 are disposed on a straight line extending to Y-axis direction through a center of the action portion 21 so that the strain resistance elements S3, S4 and the strain resistance elements S7, S8 pinch the straight line. The temperature compensation resistance elements 24 for correcting output strains of the strain resistance elements S1 to S8 caused by a temperature and the monitoring resistance element 24a for monitoring the temperature compensation resistance elements 24 whether they operate correctly or not are disposed at predetermined positions with respect to the strain resistance elements S1 to S8 and the through holes A to D, respectively.

The support portion 22 is located in a periphery portion of the force sensor chip 2, where is an outside portion of the through holes A to D and a whole part or a part of the support portion 22 is connected to the fixing portion 32 of the attenuator 3 through the thin glass film 10 (see FIG. 1B).

As shown in FIG. 3, the strain resistance elements S1 to S8 are made of an active layer (diffusion layer) having a rectangular shape formed on a surface (upper layer portion) of the semiconductor substrate 20. Although not shown, the strain resistance elements S1 to S8 are configured so that resistances of the elements S1 to S8 change if the elements S1 to S8 are strained by an external force in a longitudinal direction of the elements S1 to S8.

The strain resistance elements S1 to S8 are disposed in the connection portion 23 and detect an external force based on a strain of the connection portion 23. The longitudinal directions of the strain resistance elements S1 to S8 are arranged in parallel with the Y-axis direction.

The through holes A to D are disposed so that the bridging portions 23a1, 23a2, the elastic portion 23a3, the bridging portion 23a4, the bridging portions 23b1, 23b2, the elastic portion 23b3, and the bridging portion 23b4 are partitioned each other.

The bridging portion 23a1 is partitioned by the through holes A and C. The bridging portion 23a2 is partitioned by the through holes A and D. The elastic portion 23a3 is partitioned by the through holes A, C, and D. The bridging portion 23a4 is partitioned by the through holes C and D. In addition, the bridging portion 23b1 is partitioned by the through holes B and C. The bridging portion 23b2 is partitioned by the through holes B and D. The elastic portion 23b3 is partitioned by the through holes B, C, and D. The bridging portion 23b4 is partitioned by the through holes C and D. In addition, the through holes A, B, C, and D are disposed to form a free end (hinge) against the support portion 22 by being located at positions adjacent to the bridging portions 23a1, 23a2, 23b1, 23b2, and the elastic portions 23a3, 23b3. Due to the through holes A to D, strains induced by the applied external force F (see FIG. 1) are remarkably generated at positions where the strain resistance elements S1 to S8 are arranged, while the strains are not generated at positions where the temperature compensation resistance elements 24 and the monitoring resistance element 24a are arranged.

Since a periphery portion adjoining the through holes A to D can move freely without stress by disposing the holes A to D, the periphery portion forms a free end to which a tensile force and a compressive force are not applied by the external force F even if the external force F (see FIG. 1A, FIG. 1B) is applied to the action portion 21. On the other hand, in the bridging portions 23a1, 23a2, 23a4, 23b1, 23b2, and 23b4, especially at positions where the strain resistance elements S1 to S8 are arranged, the tensile force and the compressive force are applied in a predetermined direction. It is noted that shapes of the through holes A to D are not limited to the shapes in FIG. 3.

The temperature compensation resistance elements 24 are resistance elements identical to the strain resistance elements S1 to S8, and arranged on the semiconductor substrate 20 at eight predetermined positions corresponding to the strain resistance elements S1 to S8, respectively.

According to the arrangement described above, the force sensor chip 2 which is excellent in symmetrical property of the output can be achieved. As a result, output characteristics of the force sensor chip 2 are improved, thereby resulting in reduction of a calculation volume required for signal processing.

The temperature compensation resistance elements 24 are under a temperature identical to that of the strain resistance elements S1 to S8, and arranged at positions where the elements 24 are not affected by a strain due to the external force F to be applied. That is, the temperature compensation resistance elements 24 are located in the vicinity of the corresponding strain resistance elements S1 to S8, respectively, and arranged at positions close to inner peripheries, where the inner peripheries form free ends, of the through holes A to D.

As described above, the force sensor chip 2 is configured so that a resistance of each of the strain resistance elements S1 to S8 can be detected without effects of an ambient temperature by canceling a resistance change due to the ambient temperature included in resistance change of each of the strain resistance elements S1 to S8 by arranging each of the temperature compensation resistance elements 24 at a position where a resistance of each of the elements 24 is changed only by the ambient temperature.

Specifically, a bridged circuit is formed using a temperature compensation resistance element 24 and one of the strain resistance elements S1 to S8. A resistance change of each of the strain resistance elements S1 to S8 due to only the external force F are detected and output by comparing a resistance change of one of the strain resistance elements S1 to S8 due to a temperature change and the external force F (see FIG. 1A, FIG. 1B) with a resistance change of the temperature compensation resistance element 24.

Figure 5A:
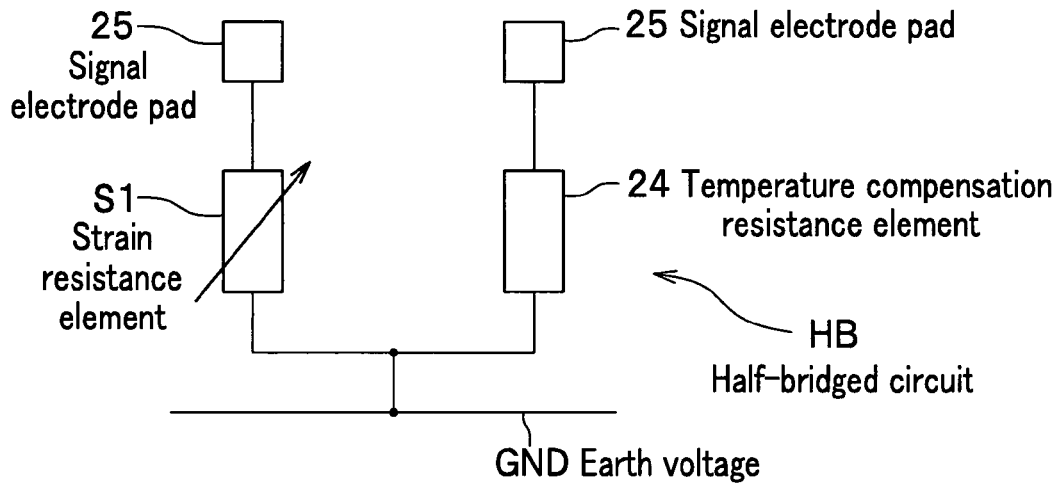
FIG. 5A is an electric circuit showing a half-bridged circuit for explaining electric connections between a strain resistance element and a temperature compensation resistance element in a force sensor chip according to the present invention.
Figure 5B:
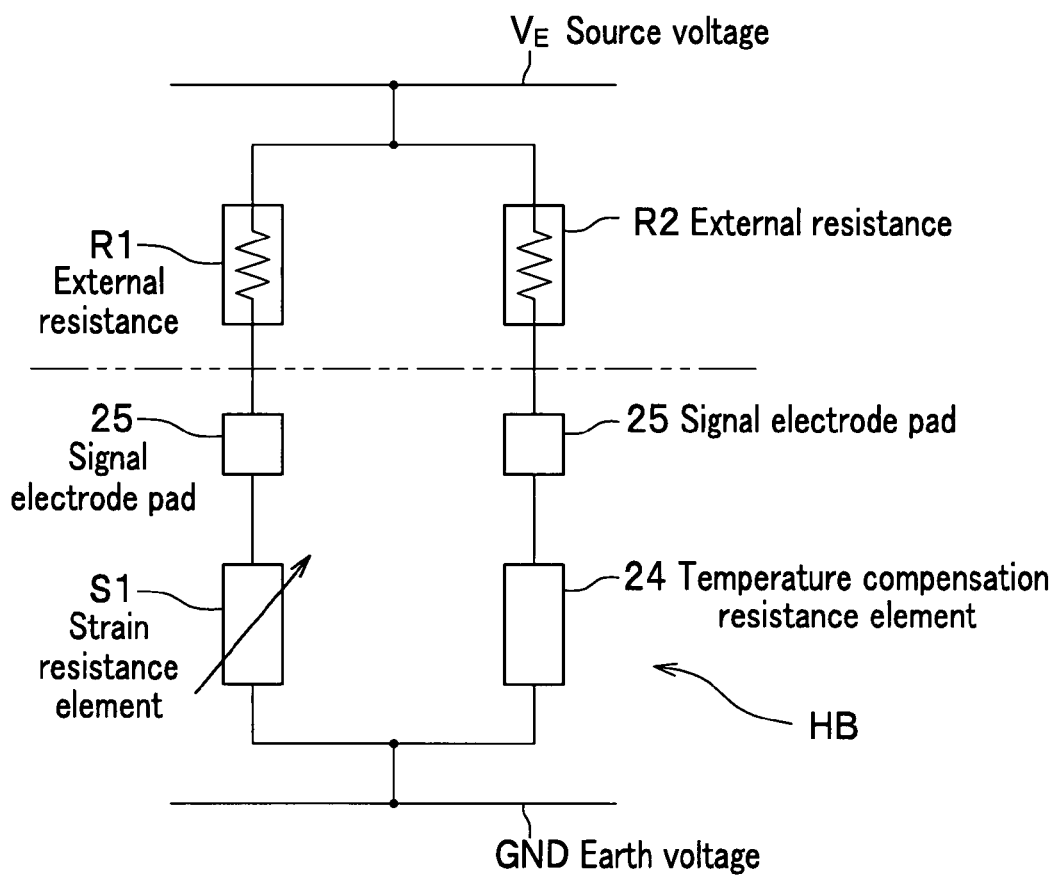
FIG. 5B is an electric circuit showing a full-bridged circuit, which is formed by adding external resistances to the force sensor chip according to the present invention.

Here, electric connections between each of the strain resistance elements S1 to S8 and each of the temperature compensation resistance elements 24 corresponding to the each of the strain resistance elements S1 to S8 will be explained by referring to FIG. 5A and FIG. 5B. FIG. 5A is an electric diagram showing a half-bridged circuit for explaining electric connections between a strain resistance element and a temperature compensation resistance element in the force sensor chip according to the present invention. FIG. 5B is an electric diagram showing a full-bridged circuit in which external resistances are added to the force sensor chip according to the present invention. Generally, the full-bridged circuit is formed in the force sensor chip 2. However, a full-bridged circuit may be formed by adding an external resistance to a half-bridged circuit, as in the case of the present embodiment.

In FIG. 5A and FIG. 5B, a circuit including the strain resistance element S1 and the temperature compensation resistance element 24, which is arranged in the vicinity of the strain resistance element S1, is shown. However, a circuit identical to the circuit described above is formed with respect to each of the strain resistance elements S2 to S8 and each of the temperature compensation resistance elements 24, which are arranged in the vicinity of each of the strain resistance elements S2 to S8.

In the force sensor chip 2 (see FIG. 3A, FIG. 3B) according to the present invention, as shown in FIG. 5A, the strain resistance elements S1 to S8 and temperature compensation resistance elements 24, which correspond to the elements S1 to S8, respectively, and cancel effects due to the temperature, form half-bridged circuits HB, which correspond to a bottom half of the bridged circuit.

Specifically, in the half-bridged circuits HB, one end of each of the strain resistance elements S2 to S8 and one end (bottom side in FIG. 5A) of each of the temperature compensation resistance elements 24 are connected each other, and also connected to the GND earth voltage via GND electrode pads 26 (see FIG. 3). The other ends (upper side in FIG. 5A) of each of the strain resistance elements S1 to S8 and each of the temperature compensation resistance elements 24 are connected to signal electrode pads 25, 25, respectively.

By connecting an upper half of the bridged circuit to the half-bridged circuit HB, thereby forming a full-bridged circuit, resistance values, in which the effects of the temperature in the strain resistance elements S2 to S8 are cancelled, can be obtained.

Specifically, as shown in FIG. 5B, the full-bridged circuit is formed as follows. One ends of external resistances R1, R2 are connected to the signal pads 25, 25, to which the other ends (upper side in FIG. 5A) of the each of the strain resistance elements S1 to S8 and temperature compensation resistance elements 24 are connected. The other ends of the external resistances R1, R2 are connected each other and also connected to a source voltage VE.

Output signals at the signal electrode pads 25, 25 of each of the strain resistance elements S1 to S8 and each of the temperature compensation resistance elements 24 are detected by the full-bridged circuit described above. Then, the resistance changes of the strain resistance elements S1 to S8 caused by only the external force F (see FIG. 1A, FIG. 1B) are extracted and detected.

Figure 6:
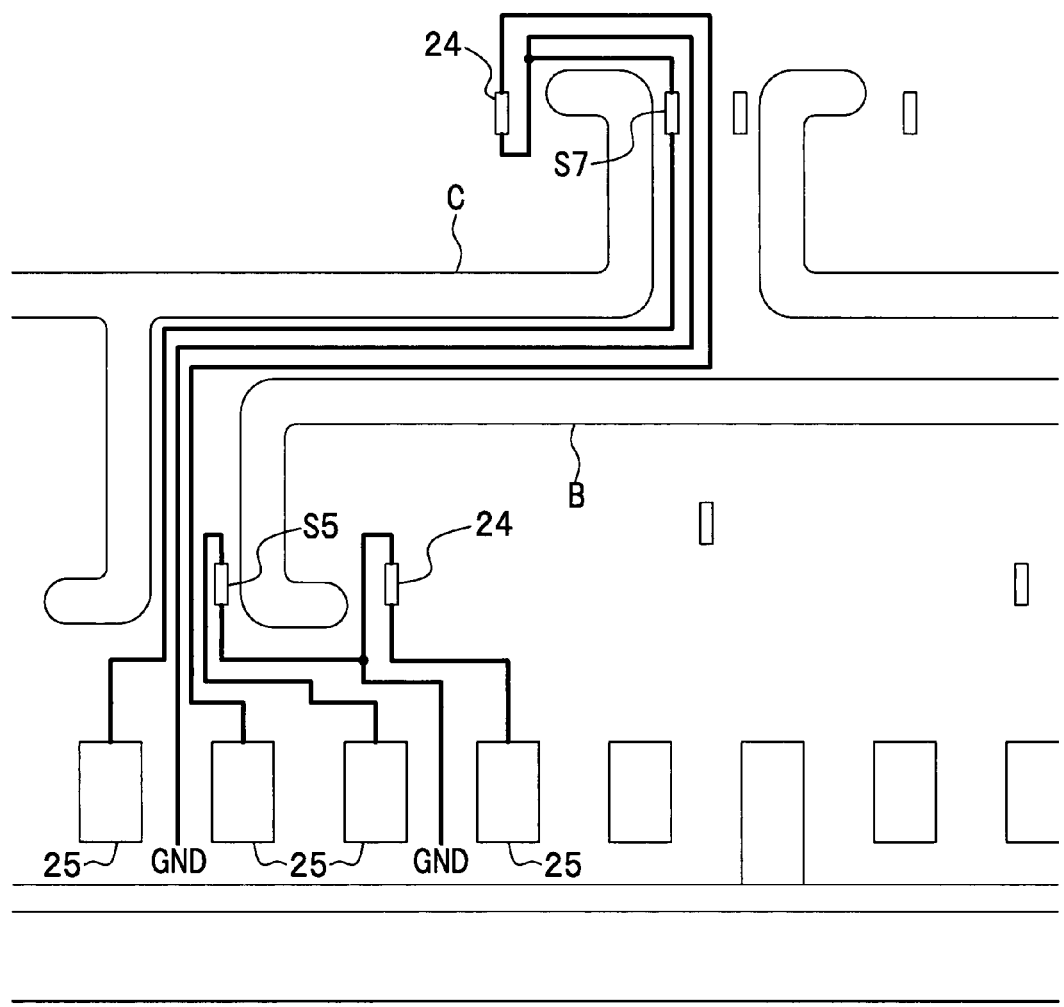
FIG. 6 is an illustration showing an implementation example of a half-bridged circuit.

An implementation example of the half-bridged circuit HB is shown in FIG. 6. The half-bridged circuit HB including the strain resistance elements S5, S7 is shown in FIG. 6. The half-bridged circuit HB including the strain resistance elements S1 to S4, S6, S8 may also be formed similarly.

Next, operations of the force sensor 1 according to the embodiment will be explained.

When the external force F which includes various kinds of axial components is applied to the force sensor 1 according to the embodiment of the present invention, the external force F is attenuated according to a predetermined ratio designed in advance and the attenuated force F is transmitted to the force sensor chip 2. Behaviors of the attenuator 3 will be explained by referring to FIGS. 7A, 7B, 7C, and 7D when the external force F which includes various kinds of axial components is applied. FIGS. 7A, 7B, 7C, and 7D are perspective views showing the behaviors of an attenuator when an external force is applied.

For example, when the external force Fx in a X-axis direction is applied to the input portion 30, as shown in FIG. 7A, the input portion 30 is slightly displaced in the X-axis direction. Similarly, when the external force Fz in a Z-axis direction is applied to the input portion 30, as shown in FIG. 7B, the input portion 30 is displaced in the Z-axis direction. In addition, when the moment My around the Y-axis is applied, as shown in FIG. 7C, the input portion 30 rotates around the Y-axis, and when the moment Mz around the Z-axis is applied, as shown in FIG. 7D, the input portion 30 rotates around the Z-axis. It is noted that the input portion 30 behaves similarly for the axial components other than the components described above. Therefore, the explanations will be omitted.

A feature of strain generated in the force sensor chip 2 will be explained by referring to FIG. 8 to FIG. 11 when the external force F (Fx, Fz, My, Mz) is applied.

Figure 8A:
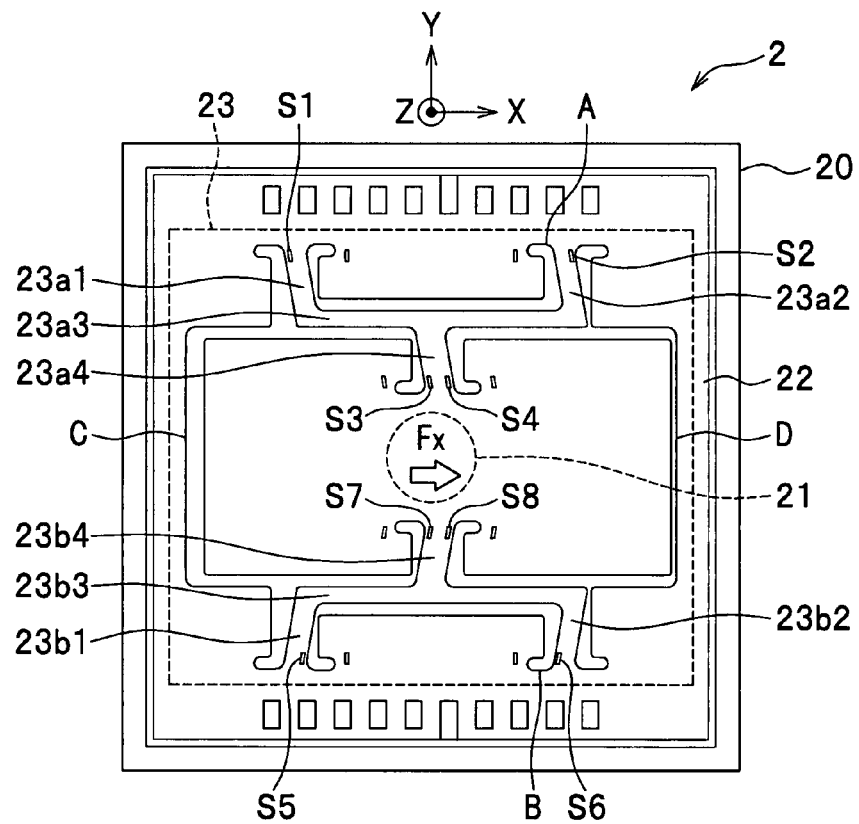
FIG. 8A is a schematic plane view for explaining strains of strain resistance elements when an external force Fx in a X-axis direction is transmitted to an action portion.
Figure 8B:
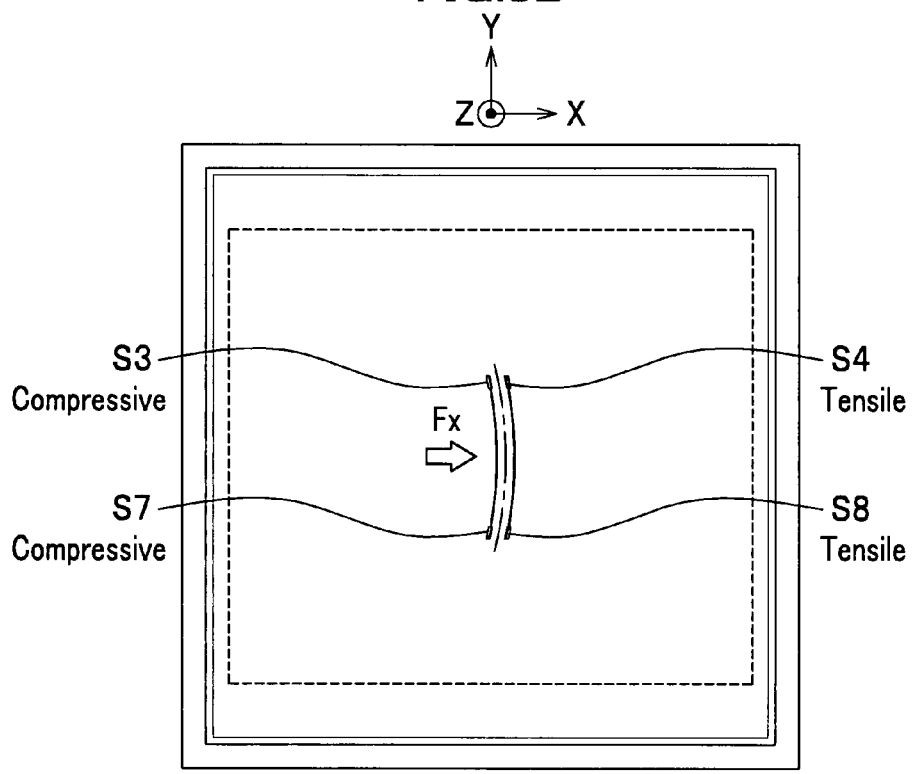
FIG. 8B is a schematic plane view for explaining strains of the strain resistance elements when the external force Fx in the X-axis direction is transmitted to the action portion and showing the strains of the strain resistance elements.

FIG. 8A is a schematic diagram in plane view for explaining strains of strain resistance elements when the external force Fx in the X-axis direction is transmitted to an action portion. FIG. 8B is a plane view showing the strains of the strain resistance elements.

As shown in FIG. 8A, when the external force Fx is applied, the action portion 21 is displaced in the X-axis direction, thereby generating remarkable deflections in the bridging portions 23a1, 23a2, 23a4, 23b1, 23b2, and 23b4. In this case, as shown in FIG. 8B, a tensile force operates on the strain resistance elements S4, S8 which are located on an outer side of the deflections, thereby resulting in increase in resistance. On the other hand, a compressive force operates on the strain resistance elements S3, S7 which are located on an inner side of the deflections, thereby resulting in decrease in resistance. Similarly, a tensile force operates on the strain resistance elements S1, S6 which are located on outer side of the deflection, thereby resulting in increase in resistance. On the other hand, a compressive force operates on the strain resistance elements S2, S5 which are located on inner side of the deflection, thereby resulting in decrease in resistance.

Figure 9A:
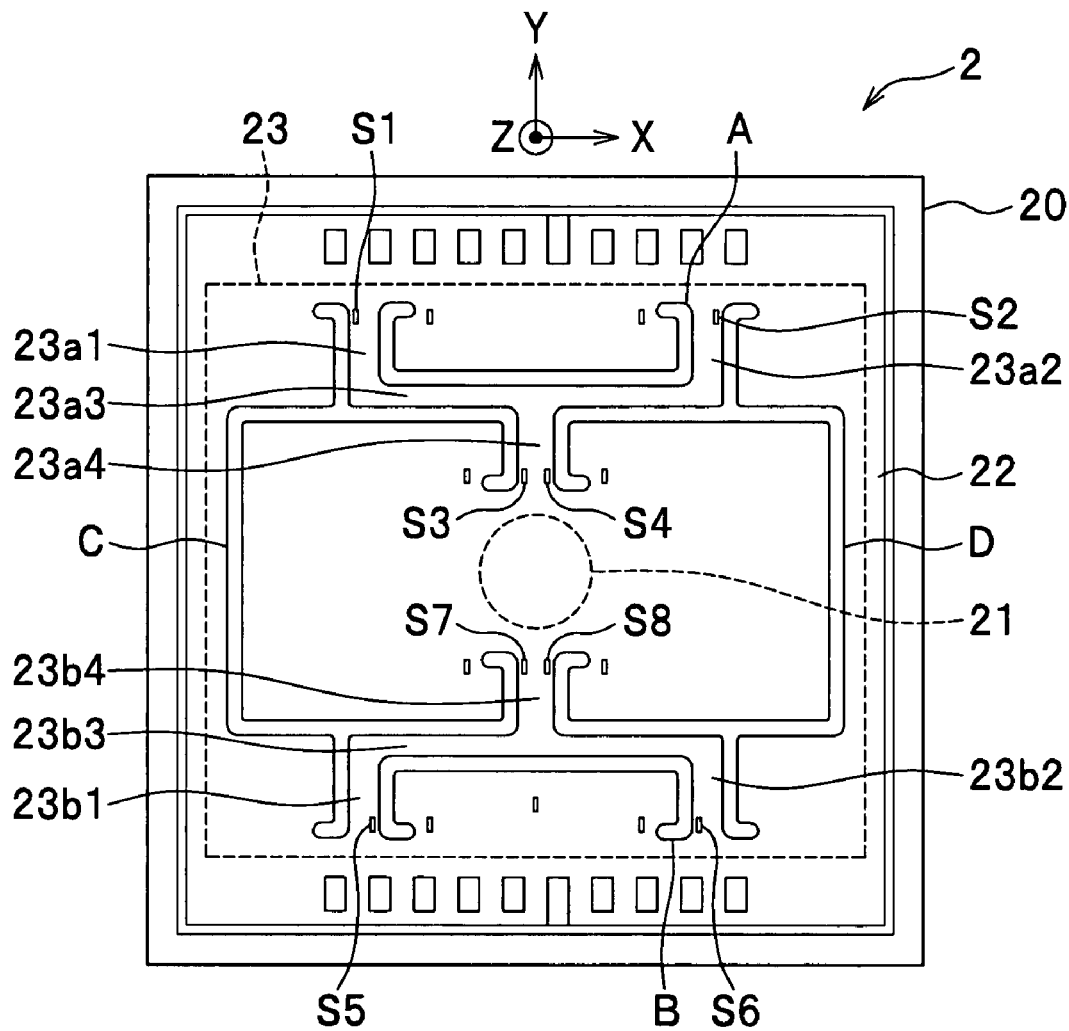
FIG. 9A is a schematic plane view for explaining strains of strain resistance elements when an external force Fz in a Z-axis direction is transmitted to an action portion.
Figure 9B:
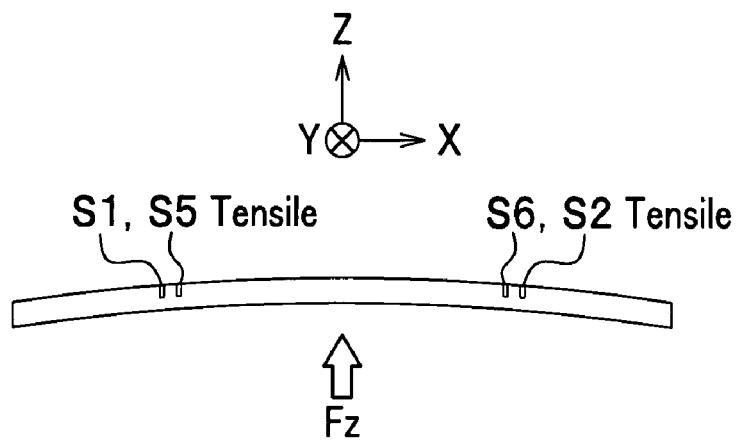
FIG. 9B is a schematic plane view for explaining strains of the strain resistance elements when the external force Fz in the Z-axis direction is transmitted to the action portion and showing the strains of the strain resistance elements.

FIG. 9A is a schematic diagram in plane view for explaining strains of strain resistance elements when the external force Fz in a Z-axis direction is transmitted to an action portion. FIG. 9B is a cross sectional view showing strains of the strain resistance elements.

As shown in FIG. 9B, when the external force Fz is applied, the action portion 21 is displaced in the Z-axis direction, thereby generating remarkable deflections in the bridging portions 23a1, 23a2, 23a4, 23b1, 23b2, and 23b4. In this case, since the strain resistance elements S1, S2, S5, and S6 are formed on a surface (upper portion) of the semiconductor substrate 20, a tensile force operates on the strain resistance elements S1, S2, S5, and S6, thereby resulting in increase in resistance. Similarly, a tensile force operates on the strain resistance elements S3, S4, S7, and S8, thereby resulting in increase in resistance.

Figure 10A:
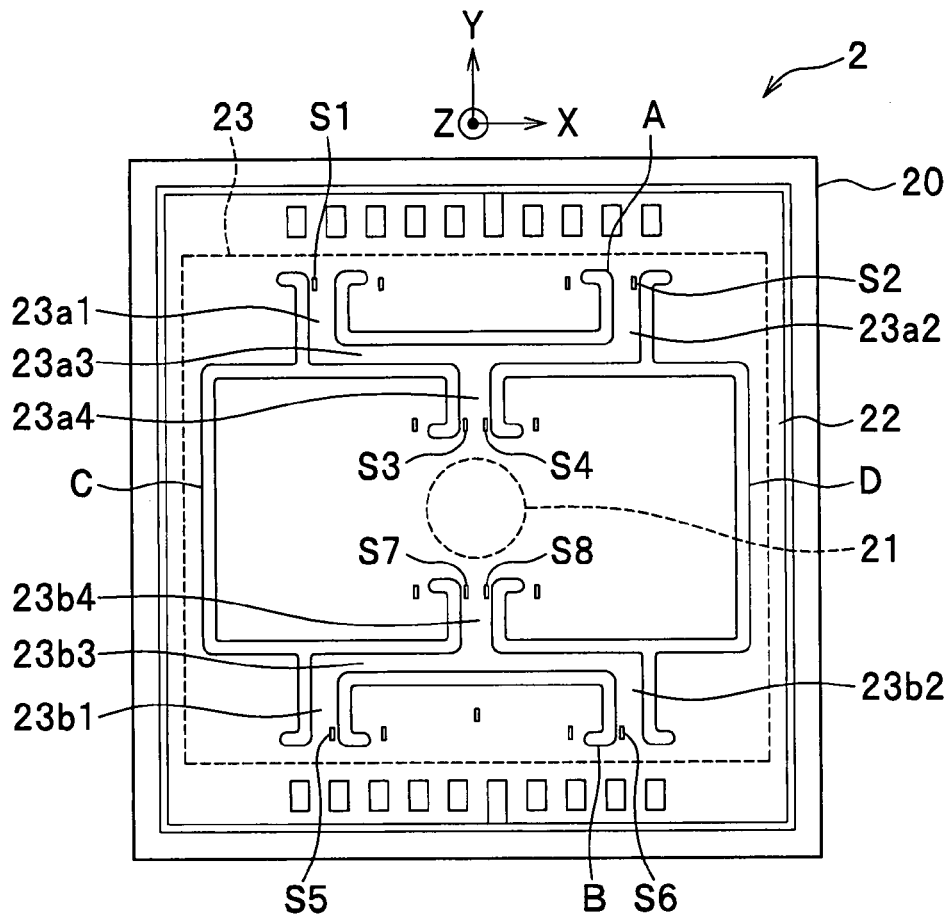
FIG. 10A is a schematic plane view for explaining strains of strain resistance elements when a moment My around a Y-axis is applied.
Figure 10B:
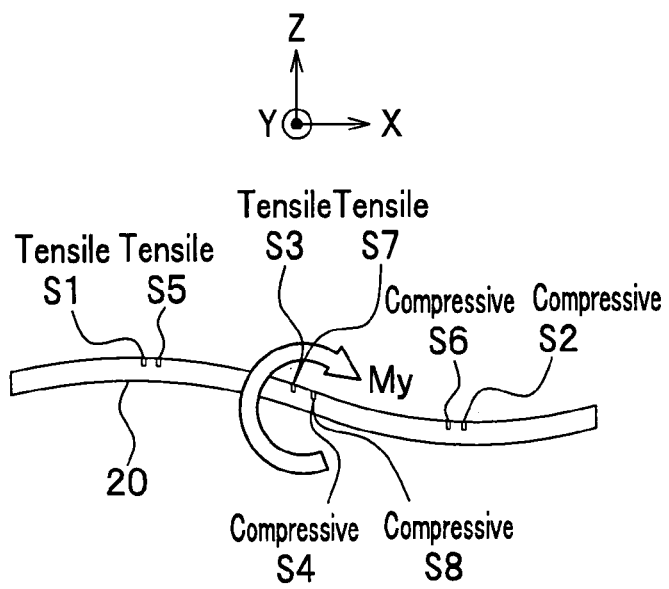
FIG. 10B is a schematic plane view for explaining strains of the strain resistance elements when the moment My around the Y-axis is applied and showing the strains of the strain resistance elements.

FIG. 10A is a schematic diagram in plane view for explaining strains of strain resistance elements when the moment My around the Y-axis is applied. FIG. 10B is a cross sectional view showing strains of the strain resistance elements.

As shown in FIG. 10B, when the external moment My is applied, deflections are generated in the bridging portions 23a1, 23a2, 23a4, 23b1, 23b2, and 23b4 by the moment My. Therefore, a tensile force operates on the strain resistance elements S1, S3, S5, and S7, thereby resulting in increase in resistance. On the other hand, a compressive force operates on the strain resistance elements S2, S4, S6, and S8, thereby resulting in decrease in resistance.

Figure 11A:
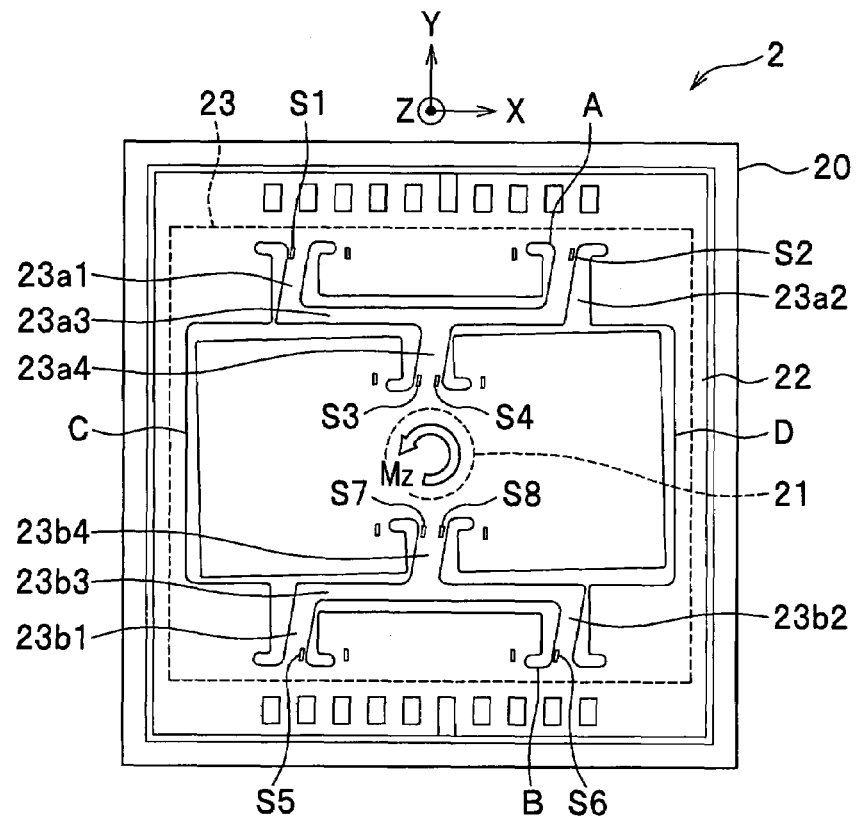
FIG. 11A is a schematic plane view for explaining strains of strain resistance elements when a moment Mz around a Z-axis is applied.
Figure 11B:
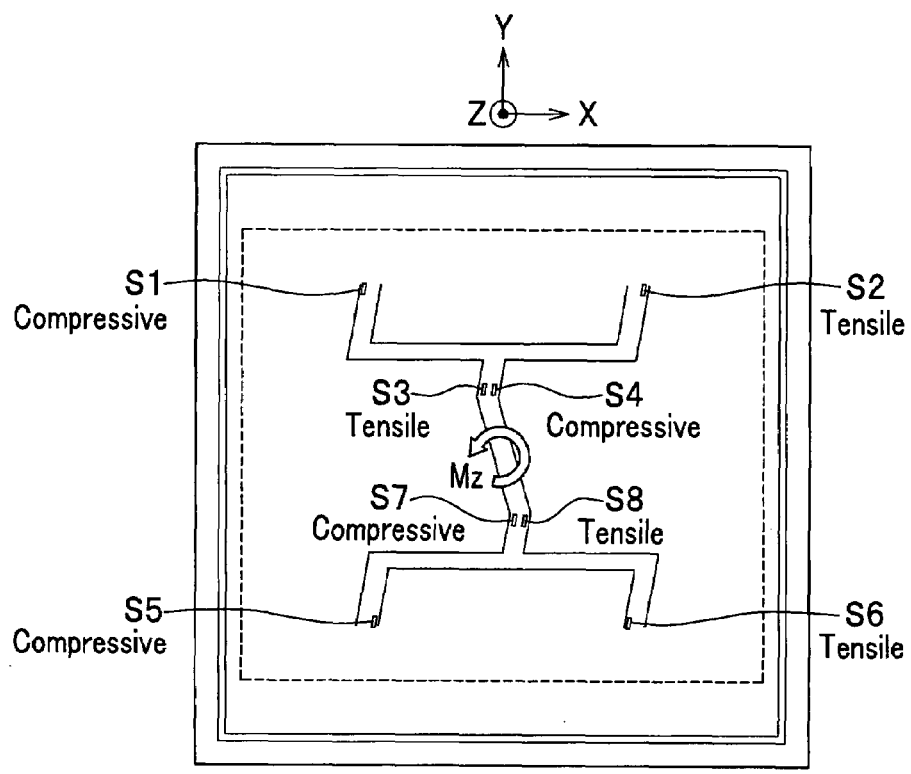
FIG. 11B is a schematic plane view for explaining strains of the strain resistance elements when the moment Mz around the Z-axis is applied and showing the strains of the strain resistance elements.

FIG. 11A is a schematic diagram in plane view for explaining strains of strain resistance elements when the moment Mz around the Z-axis is applied. FIG. 11B is a cross sectional view showing strains of the strain resistance elements.

As shown in FIG. 11B, when the external moment Mz is applied, deflections are generated in the bridging portions 23a1, 23a2, 23a4, 23b1, 23b2, and 23b4 by the moment My. Therefore, a tensile force operates on the strain resistance elements S2, S3, S6, and S8 which are arranged on an outer side of the reflections, thereby resulting in increase in resistance. On the other hand, a compressive force operates on the strain resistance elements S1, S4, S5, and S7 which are arranged on an inner side of the reflections, thereby resulting in decrease in resistance.

As described above, a relation between each component (force or moment) of the external force F and a force operated on the strain resistance elements S1 to S8 has been explained by simplifying the force F conceptually, by using four axial forces as typical examples. Since a resistance of each of the strain resistance elements S1 to S8 increases or decreases when a tensile or compressive force operates on each of the elements S1 to S8, a change rate of the resistance (resistance change rate) is detected using the bridged circuit (see FIG. 5)

Signals finally output from the six-axial force sensor 1 based on the resistance change rate are operation resistance change rates Sig1 to Sig6, which correspond to each single component (Fx, Fy, Fz, Mx, My, Mz) of the external force F.

That is, each of the operation resistance change rates Sig1 to Sig6 is determined from the resistance change rates as follows by excluding interferences among the axes as small as possible and associating the operation resistance change rates Sig1 to Sig6 with each component (Fx, Fy, Fz, Mx, My, Mz) included in the external force F.

$$Sig1=(R'S1-R'S2-R'S3+R'S4-R'S5+R'S6-R'S7+R'S8)/8$$

$$Sig2=(R'S1+R'S2+R'S3+R'S4-R'S5-R'S6-R'S7-R'S8)/8$$

$$Sig3=(R'S1+R'S2-R'S3-R'S4+R'S5+R'S6-R'S7-R'S8)/8$$

$$Sig4=(R'S1+R'S2-R'S3-R'S4-R'S5-R'S6+R'S7+R'S8)/8$$

$$Sig5=(R'S1-R'S2-R'S3+R'S4+R'S5-R'S6-R'S7+R'S8)/8$$

$$Sig6=(R'S1-R'S2-R'S3+R'S4+R'S5-R'S6+R'S7-R'S8)/8$$

Here, the resistance change rate is expressed, for example, as R'S1. The R'S1 indicates a resistance change rate of the strain resistance element S1. It is noted that the R'S1 to R'S8 indicate the resistance change rates of the strain resistance elements S1 to S8, respectively, after canceling effects of the temperature.

Relations between the six-axis components (Fx, Fy, Fz, Mx, My, Mz) and the operation resistance change rates Sig1 to Sig6 will be explained. To calculate each component of the applied external force F based on the operation resistance change rates Sig1 to Sig6, which are output signals of the force sensor 1, the output signals of the Sig1 to Sig6 are acquired in advance by applying a single component axial force to the force sensor chip 2. By the procedure described above, the relations between the six-axis components (Fx, Fy, Fz, Mx, My, Mz) and the operation resistance change rates Sig1 to Sig6 can be obtained.

It is noted that the above calculation is executed based on an idea identical to the technologies disclosed in Japanese Laid-open Patent Publications No. 2003-207405 (for example, FIG. 13) and No. 2006-125873, which are prior applications by the present applicant.

Based on the experiment described above, the operation resistance change rates Sig1 to Sig6 can be expressed with a linear expression of the six-axis components (Fx, Fy, Fz, Mx, My, Mz) by excluding interferences among the axes as small as possible. In addition, the six-axis components (Fx, Fy, Fz, Mx, My, Mz) can be expressed with a linear expression of the operation resistance change rates Sig1 to Sig6 by calculating an inverse matrix of the linear expression (determinant of matrix) of the six-axis components (Fx, Fy, Fz, Mx, My, Mz). As described above, the six-axis components (Fx, Fy, Fz, Mx, My, Mz) can be obtained from the operation resistance change rates Sig1 to Sig6 (refer to a paragraph [0070] of the Japanese Laid-open Patent Publications No. 2003-207405 in detail).

In the force sensor chip 2 according to the embodiment, longitudinal directions of the strain resistance elements S1 to S8 are oriented in a same direction. By the arrangement described above, uniformity of characteristics of the strain resistance elements S1 to S8 can be improved even if there is a small difference in crystal orientation by manufacturing between a surface of the semiconductor substrate 20 and the crystal orientation such as (100), (110), and (111). As a result, a correction of non-uniformity of the detected values is unnecessary, thereby resulting in simplification of the signal processing.

Here, a relation between a type of the semiconductor substrate 20 and a longitudinal direction of the strain resistance elements S1 to S8 will be explained.

Table 1 indicates relations among a material and a conductive type of the semiconductor substrate 20 and a gauge factor in a strain direction.

TABLE 1

|  |  | Semiconductor material | | | |
|---|---|---|---|---|---|
|  |  | Ge | | Si | |
|  | Strain | Conductive type | | Conductive type | |
|  | direction | n | p | n | p |
| Gauge factor tendency | <100> | small | small | large | Small |
|  | <110> | large | middle | middle | large |
|  | <111> | large | large | small | large |

As shown in Table 1, a gauge factor is largely different depending on a material of the semiconductor substrate 20 whether it is Ge or Si, a conductive type whether it is n-type or p-type, and a strain direction on the substrate surface whether it is <100> or <110> or <111>.

Here, if the semiconductor substrate 20 of the force sensor 1 according to the present invention is made of Si, it is preferable to align a direction having a large gauge factor with a longitudinal direction of the strain resistance elements S1 to S8.

Table 2 and Table 3 show a relation between a conductive type of a strain resistance element and a longitudinal direction of the strain resistance element, and examples of preferable crystal orientation of a Si substrate surface.

TABLE 2

|  | Conductive type of silicon | |
|---|---|---|
|  | n | p |
|  | Longitudinal direction of element | |
|  | <100> | <110> |
| Examples of preferable crystal orientation of silicon substrate surface | (100) (110) | (100) (110) (111) |

TABLE 3

|  | Conductive type of silicon | |
|---|---|---|
|  | n | p |
|  | Longitudinal direction of element | |
|  | <100> | <111> |
| Examples of preferable crystal orientation of silicon substrate surface | (110) | (110) |

Since a direction having a large gauge factor and a longitudinal direction of the strain resistance elements S1 to S8 can be aligned in a same direction by selecting a combination shown in Table 2 and Table 3, detected values of the strain resistance elements S1 to S8 can be increased.

The embodiment of the present invention has been explained. However, the present invention is not limited to the embodiment described above and can be modified as needed.

For example, in the embodiment, the thin glass film 10 is formed by evaporation or sputtering. However, a method for forming the thin glass film 10 is not limited to evaporation and sputtering. Other film formation method such as ionplating (IP) and chemical vapor deposition (CVD) may also be applied. There are many kinds of technologies for forming a thin glass film and the technologies progress day by day. However, a technology for forming the thin glass film is selected as needed by considering, for example, a sensitivity required for the force sensor, a performance such as durability, a cost, and a production volume.

In the embodiment, the thin glass film 10 is formed on the attenuator 3, and the attenuator 3 and force sensor chip 2 are bonded through the thin glass film 10. However, the thin glass film 10 may be formed on the force sensor chip 2, and the force sensor chip 2 and attenuator 3 may be bonded by anodic-bonding through the thin glass film 10. In addition, the thin glass film 10 may be formed in advance on the force sensor chip 2, and the force sensor chip 2 and bonding device 3 may be bonded by anodic-bonding.

Practically, the thin glass film 10 formed on the force sensor chip 2 and the attenuator 3 are bonded by anodic-bonding by applying a minus voltage to the force sensor chip 2 and a plus voltage to the attenuator 3.

It is noted that if the thin glass film is formed on the force sensor chip 2, a thin glass film may also be formed as needed by, for example, evaporation, sputtering, and other thin film formation method as in the case where the thin glass film is formed on the attenuator 3.

A glass plate instead of the thin glass film 10 may also be used.

In the embodiment, the action portion 21 is arranged in a center portion of the force sensor chip 2, and the connection portion 23 and support portion 22 are arranged outside the action portion 21. However, the arrangement is not limited to this. The support portion 22 may be arranged in the center portion and the connection portion 23 is arranged outside the support portion 22. Then, the action portion 21 is arranged outside the connection portion 23. That is, the force sensor chip 2 only requires the following configuration, in which the connection portion 23 can detect the external force F transmitted to the action portion 21 by a strain resistance element S arranged at a position close to the action portion 21 in the support portion 23, and the support portion 22 is able to support the connection portion 23 and action portion 21.

In addition, in the embodiment, the force sensor chip 2 is formed in approximately a square. However, a shape of the force sensor chip 2 is not limited to the square. The shape may be rectangle or circular. In addition, the attenuator 3 may be formed in a cube or a rectangular solid. In the present invention, various configurations may be adopted for the shapes of the force sensor chip 2 and attenuator 3, and for a combination of the force sensor chip 2 and attenuator 3.

In addition, arrangement positions of the strain resistance elements S1 to S8 and temperature compensation resistance elements 24 may be different from those of the present embodiment.

What is claimed is:

1. A force sensor, comprising:
a force sensor chip comprising a base member and a plurality of strain resistance elements; and
an attenuator which is connected to a support portion and an action portion, and applies an input external force to the action portion by attenuating the input external force,
wherein the base member comprises:
the action portion to which the external force is applied through the attenuator,
the support portion supporting the action portion, and
a connection portion which connects the action portion and the support portion and deflects according to an applied external force,
wherein the connection portion comprises:
first bridging portions each of whose one end is connected to the support portion and extending in a first axis direction,
a beam-like elastic portion whose both ends are connected to each of the other ends of the first bridging portions and extending in a second axis direction intersecting with the first axis direction, and
a second bridging portion whose one end is connected to around a center of the beam-like elastic portion and extending in the first axis direction,
wherein the plurality of strain resistance elements are arranged in the connection portion and detect the applied external force based on a deflection of the connection portion,
wherein the strain resistance elements are disposed in an identical direction and within a same plane on at least the first bridging portions and the second bridging portion, and
wherein the first bridging portions are formed separately and independently from other bridging portions.

2. A force sensor chip, comprising:
a base member, which includes
an action portion to which an external force is applied through an attenuator,
a support portion supporting the action portion, and
a connection portion which connects the action portion and the support portion and deflects according to the applied external force; and
a plurality of strain resistance elements which are arranged in the connection portion and detect the applied external force based on a deflection of the connection portion,
wherein the connection portion comprises:
first bridging portions each of whose one end is connected to the support portion and extending in a first axis direction,
a beam-like elastic portion whose both ends are connected to each of the other ends of the first bridging portions and extending in a second axis direction intersecting with the first axis direction, and
a second bridging portion whose one end is connected to around a center of the beam-like elastic portion and extending in the first axis direction,
wherein the strain resistance elements are disposed in an identical direction and within a same plane on at least the first bridging portions and the second bridging portion, and
wherein the first bridging portions are formed separately and independently from other bridging portions.

3. The force sensor chip according to claim 2,
wherein the base member is made of a silicon substrate whose surface has a crystal orientation of (100).

4. The force sensor chip according to claim 3,
wherein the plurality of the strain resistance elements are made of a n-type semiconductor and the longitudinal directions of the plurality of the strain resistance elements are oriented in <100> direction.

5. The force sensor chip according to claim 3,
wherein the plurality of the strain resistance elements are made of a p-type semiconductor and the longitudinal directions of the plurality of the strain resistance elements are oriented in <110> direction.

6. The force sensor chip according to claim 2,
wherein the base member is made of a silicon substrate whose surface has a crystal orientation of (110).

7. The force sensor chip according to claim 6,
wherein the plurality of the strain resistance elements are made of a n-type semiconductor and the longitudinal directions of the plurality of strain resistance elements are oriented in <100> direction.

8. The force sensor chip according to claim 6,
wherein the plurality of the strain resistance elements are made of a p-type semiconductor and the longitudinal directions of the plurality of the strain resistance elements are oriented in <110> direction.

9. The force sensor chip according to claim 6,
wherein the plurality of strain resistance elements are made of a p-type semiconductor and the longitudinal directions of the plurality of strain resistance elements are oriented in <111> direction.

10. The force sensor chip according to claim 2,
wherein the base member is made of a silicon substrate whose surface has a crystal orientation of (111).

11. The force sensor chip according to claim 10,
wherein the plurality of the strain resistance elements are made of a p-type semiconductor and the longitudinal directions of the plurality of the strain resistance elements are oriented in <110> direction.

12. The force sensor chip according to claim 2,
wherein the plurality of the strain resistance elements are composed of eight strain resistance elements.

13. The force sensor chip according to claim 2, further comprising:
a temperature compensation resistance element for canceling a resistance change, which is caused by a temperature change, of each of the plurality of the strain resistance elements.

14. The force sensor chip according to claim 2,
wherein one end of the action portion is connected to one second bridging portion and the other end of the action portion is connected to another second bridging portion at a position opposite to the one end of the action portion.

15. The force sensor chip according to claim 2,
wherein a plurality of temperature compensation elements are arranged in a manner to be unaffected by a strain due to the applied external force at a position near inner peripheries of a plurality of holes and at a position corresponding to each of the plurality of strain resistance elements.

16. The force sensor chip according to claim 15,
wherein the temperature compensation elements are disposed in a free end portion against the support portion which is partitioned by the through holes.

* * * * *